(12) United States Patent
Kunz et al.

(10) Patent No.: US 11,727,078 B2
(45) Date of Patent: Aug. 15, 2023

(54) MANAGEMENT OF CLIENT DEVICES FOR MAINTENANCE OF A STRUCTURAL PRODUCT

(71) Applicant: THE BOEING COMPANY, Chicago, IL (US)

(72) Inventors: Jared B. Kunz, Kent, WA (US); Bradley D. Gorter, Renton, WA (US); Rex Byron Douglas, Sammamish, WA (US); Michael R. Munsey, Edgewood, WA (US); Joshua J. Lavalleur, Kent, WA (US); Michael E. Norman, Auburn, WA (US)

(73) Assignee: THE BOEING COMPANY, Arlington, VA (US)

( * ) Notice: Subject to any disclaimer, the term of this patent is extended or adjusted under 35 U.S.C. 154(b) by 343 days.

(21) Appl. No.: 16/703,090

(22) Filed: Dec. 4, 2019

(65) Prior Publication Data

US 2020/0334319 A1    Oct. 22, 2020

Related U.S. Application Data

(60) Provisional application No. 62/835,632, filed on Apr. 18, 2019.

(51) Int. Cl.
*G06F 16/957* (2019.01)
*G06F 3/04847* (2022.01)
(Continued)

(52) U.S. Cl.
CPC ...... *G06F 16/9577* (2019.01); *G06F 3/04847* (2013.01); *G06F 8/71* (2013.01); *G06F 16/958* (2019.01)

(58) Field of Classification Search
CPC .... G06F 16/9577; G06F 3/04847; G06F 8/71; G06F 16/958; G06F 9/451; G06F 3/0482
(Continued)

(56) References Cited

U.S. PATENT DOCUMENTS 10,114,670 B2    10/2018  Glatfelter et al.
2005/0226059 A1*  10/2005  Kavuri ................. G06F 3/0607
                                                        365/189.05
(Continued)

OTHER PUBLICATIONS

"Maintenance Performance Toolbox: Toolbox Mobile Library", Boeing Edge Information Services, 2014, pp. 1-2.

*Primary Examiner* — Stephen S Hong
*Assistant Examiner* — Broderick C Anderson
(74) *Attorney, Agent, or Firm* — Alleman Hall Creasman & Tuttle LLP

(57) ABSTRACT

An apparatus is provided for management of client devices for maintenance of a structural product. The apparatus is caused to receive device manifest reports that include information about the client devices and digital content hosted by respective library apps on the client devices. The apparatus is caused to generate a graphical user interface (GUI) to visually summarize the information, with the GUI embodied as a dashboard with a layout of software widgets. And the apparatus is caused to send the dashboard to an administrative device for display. This causes execution of the layout of software widgets on the dashboard at the administrative device to access the information from the content management platform, produce respective infographics to visually summarize the client devices and the digital content hosted by the respective library apps, based on the information, and display the respective infographics in the dashboard at the administrative device.

20 Claims, 12 Drawing Sheets

(51) Int. Cl.
*G06F 8/71* (2018.01)
*G06F 16/958* (2019.01)

(58) Field of Classification Search
USPC .......................................................... 715/200
See application file for complete search history.

(56) References Cited

U.S. PATENT DOCUMENTS

| | | | | |
|---|---|---|---|---|
| 2007/0061567 | A1* | 3/2007 | Day | H04L 9/3247 |
| | | | | 713/159 |
| 2009/0282057 | A1* | 11/2009 | Thomas | G06F 16/48 |
| 2014/0156686 | A1* | 6/2014 | Woodings | G06F 16/258 |
| | | | | 707/756 |
| 2015/0127607 | A1* | 5/2015 | Savage | G06F 16/245 |
| | | | | 707/693 |
| 2016/0357599 | A1* | 12/2016 | Glatfelter | G06Q 10/06311 |
| 2019/0222560 | A1* | 7/2019 | Ford | G06F 21/64 |
| 2020/0012799 | A1* | 1/2020 | Breuer | G06F 3/0622 |

* cited by examiner

FIG. 4

MANAGEMENT OF CLIENT DEVICES FOR MAINTENANCE OF A STRUCTURAL PRODUCT

CROSS-REFERENCE TO RELATED APPLICATION(S)

The present application claims priority to U.S. Provisional Patent Application No. 62/835,632, entitled: Content Management Dashboard and Automated System for Management of Client Devices, filed on Apr. 18, 2019, the content of which is incorporated herein by reference in its entirety.

TECHNOLOGICAL FIELD

The present disclosure relates generally to maintenance of a structural product and, in particular, to supporting maintenance of structural products with client devices that provide relevant digital content, management of the technical content for those client devices, and a content management dashboard with intuitive display of content management analytics for those client devices.

BACKGROUND

Many modern manufactured systems and other structural products such as aircraft have extensive maintenance requirements and data records. Many maintenance data systems require technicians to leave the work area to view retrieve technical manuals and other maintenance content for a system type being worked on. Other maintenance systems have been developed that allow technicians to retrieve necessary content from portable computer or handheld computing devices for ease of access.

Those maintenance solutions that require technicians to leave the work area are generally less convenient than mobile solutions, but even many mobile solutions require a significant amount of human intervention to maintain the information technology (IT) system. That is, current solutions are not automated or easy to use for the customer to maintain the aircraft. Both types of solutions generally have not been subject to the level of scrutiny that is typical in the aircraft industry. They are also not very scalable. An additional challenge that these solutions face is keeping updates to software and hardware current for each aircraft.

It would be desirable to have a system and method that takes into account at least some of the issues discussed above, as well as other possible issues.

BRIEF SUMMARY

Example implementations of the present disclosure are directed to maintenance of a structural product such as an aircraft. In particular, for example, example implementations support maintenance of aircraft with client devices that provide relevant digital content, management of the technical content for those client devices, and a content management dashboard with intuitive display of content management analytics for those client devices. The present disclosure includes, without limitation, the following example implementations.

Some example implementations provide a method of management of client devices for maintenance of a structural product, the client devices including respective library apps to download and host digital content related to the structural product on the client devices, the digital content supporting maintenance of the structural product, the method comprising a content management platform: receiving device manifest reports that include first information about the client devices and second information about the digital content hosted by the respective library apps on the client devices, the device manifest reports received from the client devices, automatically and contemporaneous with changes in the digital content hosted by the respective library apps; generating a graphical user interface (GUI) to visually summarize the information for an administrative device, the GUI embodied as a dashboard with a layout of software widgets; and sending the dashboard to the administrative device for display by the administrative device, display of the dashboard causing execution of the layout of software widgets on the dashboard at the administrative device to access the information from the content management platform, produce respective infographics to visually summarize the client devices and the digital content hosted by the respective library apps, based on the information, and display the respective infographics in the dashboard at the administrative device.

Some example implementations provide an apparatus for management of client devices for maintenance of a structural product, the client devices including respective library apps to download and host digital content related to the structural product on the client devices, the digital content supporting maintenance of the structural product, the apparatus comprising a memory configured to store computer-readable program code; and processing circuitry configured to access the memory, and execute the computer-readable program code to cause the apparatus to at least: receive device manifest reports that include first information about the client devices and second information about the digital content hosted by the respective library apps on the client devices, the device manifest reports received from the client devices, automatically and contemporaneous with changes in the digital content hosted by the respective library apps; generate a graphical user interface (GUI) to visually summarize the information for an administrative device, the GUI embodied as a dashboard with a layout of software widgets; and send the dashboard to the administrative device for display by the administrative device, display of the dashboard causing execution of the layout of software widgets on the dashboard at the administrative device to access the information from a content management platform, produce respective infographics to visually summarize the client devices and the digital content hosted by the respective library apps, based on the information, and display the respective infographics in the dashboard at the administrative device.

Some example implementations provide a computer-readable storage medium for management of client devices for maintenance of a structural product, the client devices including respective library apps to download and host digital content related to the structural product on the client devices, the digital content supporting maintenance of the structural product, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

FIGS. 3, 4 and 5 illustrate metrics and reporting that may be provided by the dashboard, according to some example implementations;

DETAILED DESCRIPTION

Figure 1A:
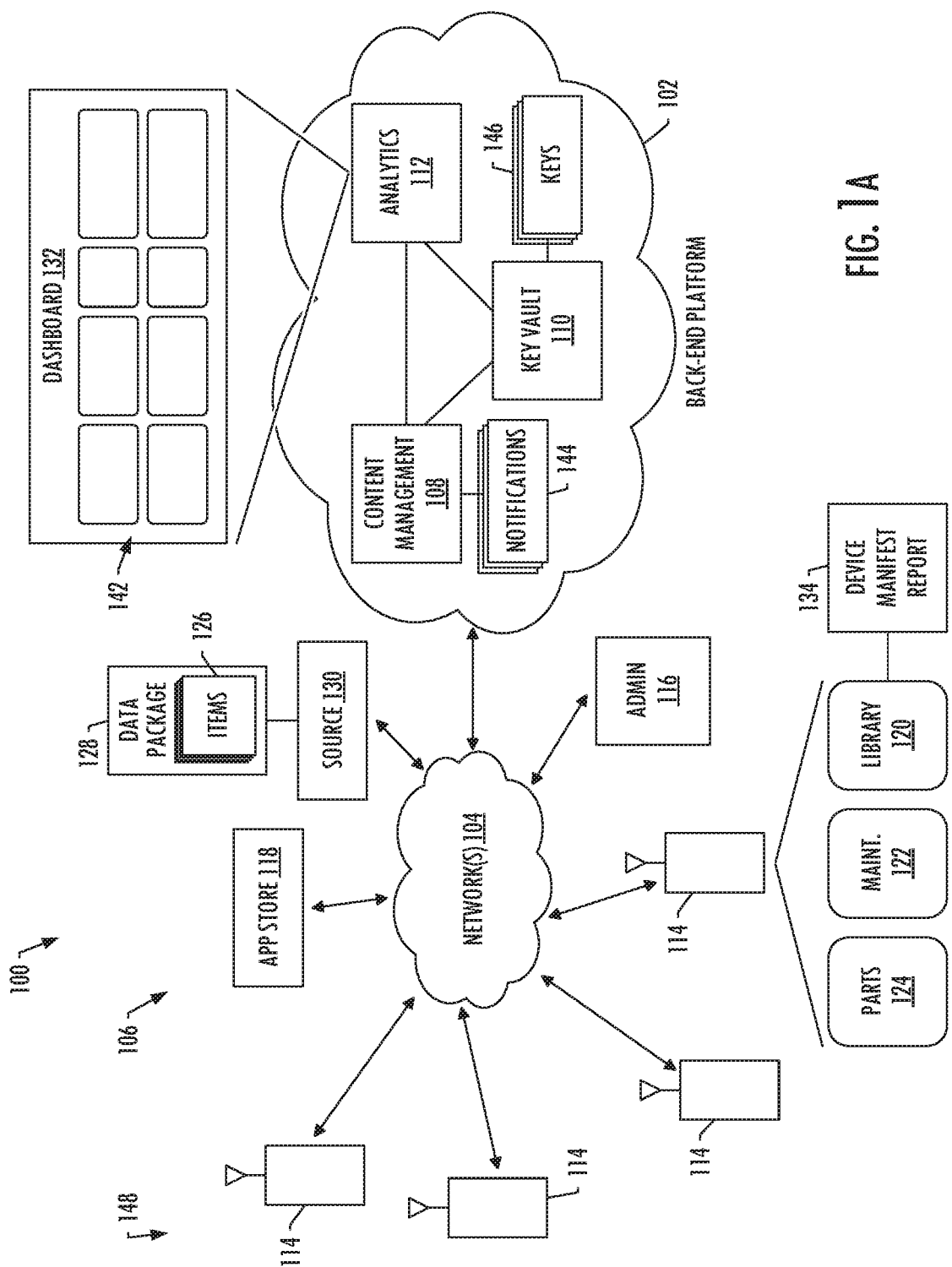
FIGS. 1A and 1B illustrate respectively a system and device manifest report, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, references to first, second or the like should not be construed to imply a particular order. Also, a feature may be described as being above another feature (unless otherwise indicated) may instead be below, and vice versa; and similarly, features described as being to the left of another feature else may instead be to the right, and vice versa. Like reference numerals refer to like elements throughout.

Example implementations of the present disclosure relate to a content management dashboard and automated system for management of client devices, such as for maintenance of a structural product. In this regard, at least some example implementations support maintenance of structural products with client devices that provide relevant digital content, management of the technical content for those client devices, and a content management dashboard with intuitive display of content management analytics for those client devices.

Example implementations will be primarily described in conjunction with aerospace applications in which the structural product is an aircraft such as an airplane. It should be understood, however, that example implementations may be utilized in conjunction with a variety of other applications, both in the aerospace industry and outside of the aerospace industry. Other examples of suitable structures include any of a number of different types of vehicles, such as spacecraft, watercraft, motor vehicles, railed vehicles and the like. Furthermore, it should be understood that unless otherwise specified, the terms "data," "content," "digital content," "information," and similar terms may be at times used interchangeably.

FIG. 1A illustrates a system 100 configured to provide a content management platform according to example implementations of the present disclosure. As shown, the system 100 may be implemented with a cloud computing architecture (not shown); and in some more particular examples, the system is implemented using the Microsoft® Azure® cloud computing service. The cloud computing architecture includes one or more of each of a number of elements such as a back-end platform 102, one or more computer networks 104 and front-end platform 106, each of which may itself include one or more of each of a number of components. Although shown and described herein in the context of a cloud computing architecture, it should be understood that the system may implemented with any of a number of different network-based architectures, such as for example, an intranet or via the Internet.

As also shown, the back-end platform 102 may include one or more co-located or distributed servers such as a content management server 108, key vault 110 and analytics server 112, which may cooperate to provide services of the content management platform. Each of the content management server 108, key vault or analytics server may be embodied as one or more server computers, a network of interworking computers (e.g., a distributed computer implemented by multiple computers) or the like. In implementations in which the content management server 108, key vault or analytics server is embodied as a distributed computer, its multiple computers may communicate over the network(s) 104.

The front-end platform 106 may include any number of client devices 114 and one or more administrative devices 116 configured to provide one or more points of access to services of the content management platform provided by the back-end platform 102 over the network 104. The point(s) of access may be provided in any of a number of different manners, such as by one or more web portals, application programs (apps), mobile apps or the like (unless specified otherwise, the term "app" may refer to an app or mobile app). In some examples, the back-end platform 102 may also include or otherwise employ one or more digital distribution platforms such as app stores 118 from which the client devices and/or administrative devices may browse and download apps. This may include different app stores for different versions of the apps for different operating systems.

In accordance with example implementations of the present disclosure, any of a number of different computing devices may be configured to embody a client device 114 or administrative device 116, or in some examples both a client device and administrative device. Examples of suitable computing devices include a desktop computer, portable computer (e.g., laptop computer, tablet computer), mobile phone (e.g., cell phone, smartphone), wearable computer (e.g., smartwatch), or other computing device that may be configured to download and execute apps.

As indicated above, example implementations of the present disclosure relate to automated system for management of client devices 114, such as for maintenance of airplanes or other structure products. In this regard, as shown for one of the client devices, each of the client devices may be configured to download and execute maintenance and engineering apps such as a library app 120, maintenance app 122 and/or parts app 124, one or more of which may be downloaded from an app store 118. For client devices 114 that are portable (e.g., portable computer, mobile phone, wearable computer) in particular, these apps support efficient maintenance and repair operations, wherever and whenever needed.

The library app 120 may improve efficiency for maintenance technicians. In some examples, the library app 120 hosts maintenance and engineering content to give technicians instant access to the content for reference and use. The library app 120 may allow a technician or other user to retrieve aircraft tail-specific information from any of a number of content sources. The library app 120 may allow the user to navigate via logical hyperlinks and specialized searches. In various examples, items 126 of digital content such as maintenance and engineering content may be downloaded to the client device 114 in packages 128 from the back-end platform 102 and/or other content source(s) 130 such as technical content authoring systems located outside the back-end platform 102. The content downloaded to the client device then be locally hosted at the client device in the library app 120, and may be accessible without a network connection.

Examples of suitable sources of maintenance and engineering content—items 126 of digital content—hosted by the library app 120 include engineering diagrams, technical drawings, wiring diagrams and the like. Other examples of suitable sources of maintenance and engineering content include an aircraft illustrated parts catalog (AIPC), aircraft flight manual (AFM), aircraft maintenance manual (AMM), aircraft recovery manual (ARM), airworthiness directive (AD), component maintenance manual (CMM), component maintenance manual parts list (CMMIPL), configuration change support data (CCSD), configuration deviation list (CDL), consumable products manual (CPM), engine (shop) manual (EM), engineering drawings (ED), equipment list (EL), dispatch deviation guide (DDG), engine cleaning inspection and repair manual (CIR), engine illustrated parts catalog (EIPC), engine parts configuration management section (EPCM), fault repair manual (FRM), fault reporting and fault isolation manual (FRM/FIM), flight crew operations manual (FCOM), general maintenance manual (GMM), illustrated tool and equipment manual (ITEM), in-service activity report (ISAR), maintenance planning document (MPD), maintenance review board report (MRB), maintenance synoptics, maintenance tips (MT), maintenance training manual (MTM), master minimum equipment list (MMEL), non-destructive testing manual (NDT), power plant build-up manual (PPBM), power plant build-up manual illustrated parts list (PPBMIPL), production management database (PMDB), repair record, service bulletin (SB), service bulletin index (SBI), service letter (SL), structural repair manual (SRM), systems description section (SDS), system schematics manual (SSM), task card manual (TCM), tool and equipment manual (TEM), weight and balance manual (WBM), wiring diagram manual (WDM), wiring diagram and schematics manual, or the like. This content (or more specifically digital content) may be formatted in any of a number of different manners, including as electronic documents, databases or the like.

The maintenance app 122 may allow technicians to quickly identify and resolve non-routine defects, reducing delays and cancellations and improving productivity. Technicians using client devices 114 that are portable in particular may be able to access the maintenance app plane-side to easily and immediately troubleshoot defects. A collaboration feature may enable the sharing of information securely in real time throughout maintenance and engineering organizations.

The maintenance app 122 may allow the user to access and research critical information for troubleshooting non-routine defects at the airplane, and communicate in real time with maintenance and engineering personnel during troubleshooting. The maintenance app 122 may integrate with the library app 120 for maintenance and engineering content, and the parts app 124 for part availability. The maintenance app 122 may provide access to aircraft maintenance history, allow the user to add photos to a case from their client device 114 (equipped with a camera), and plot location damage on three-dimensional (3D) aircraft models.

The parts app 124 may allow technicians to check on the availability of required parts using their client device 114, which when mobile may reduce the need for trips back to a line maintenance office. The parts app may provide access to the most current inventory information, for instant reference and use, wherever and whenever it is needed. This may include identifying a preferred location or multiple locations of required parts. It may include original and alternate part numbers. The parts app 124 may integrate with the library app 120 and maintenance app 122 to provide a full maintenance troubleshooting solution. For example, the parts app may allow lookup directly in an AIPC hosted by the library app.

Various services of the content management platform provided by the system 100 according to example implementations of the present disclosure will now be more fully described. In some examples, the back-end platform 102 is configured to provide a device and content management dashboard and automated system for simplified management of client devices 114, their configuration (e.g., apps 120, 122, 124, app version, etc.), and/or content downloaded to the client devices. In the context of maintenance of airplanes, the content downloaded to the client devices may include technical content, such as aircraft configuration documents, maintenance manuals and other pertinent information for their specific airplanes. The back-end platform 102 may provide highly-secure, automated client device registration and automated device management from the client device to the back-end platform 102. This may scale up to quickly to manage millions of devices and massive volumes of data due to its cloud-based design.

As shown in FIG. 1A, the back-end platform 102 and in particular the analytics server 112 may provide a graphical user interface (GUI) such as a dashboard 132 configured to capture data from or related to one or more of the maintenance and engineering apps (e.g., library app 120, maintenance app 122, parts app 124). The dashboard 132 may create analytics reports about the client devices 114 and technical content downloaded to the client devices 114, and display the information for customers to use in order to address key business questions for product, service improvements and to enable customers to meet their regulatory requirements. The dashboard 132 may be accessed in a number of different manners, such as by one or more web portals, apps or the like.

In some examples, one or more services of the content management platform provided by the system 100 may be embodied in the dashboard. As described herein, then, at least some functionality of at least the back-end platform 102 or one or more of its servers may be more simply described as functionality of the dashboard 132.

The dashboard 132 of example implementations may be integrated with the library app 120, and loosely coupled with the maintenance app 122 and parts app 124. The dashboard 132 may support data compliance for content hosted by the library app 120. This compliance may include a process and set of tools available to airline (customer) administrators, in this example, to help ensure that their client devices are loaded with the latest content, and that the maintenance and engineering apps are properly configured and up to date. For example, when a user of a client device 114 checks for updates or changes data (delete, etc.), the library app may be configured to automatically send a manifest report 134 to the back-end platform 102 for compliance reporting.

Figure 1B:
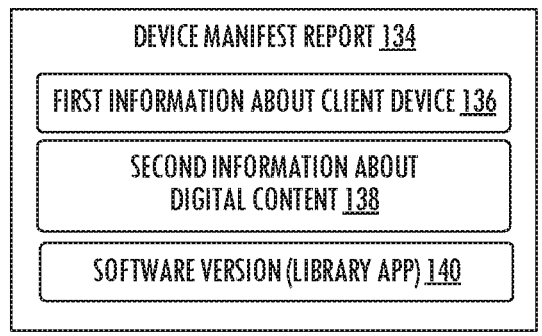

As shown in FIG. 1B and explained in greater detail below, in some examples, the device manifest report 134 includes first information 136 about the client device and second information 138 about the digital content hosted by the library app 120 on the client device 114. The information included with the device manifest report may further include software version 140 of the library app on the client device.

The dashboard 132 and automated solution may be integrated with apps such as the library app 120, maintenance app 122 and parts app 124, which may be available to download from an app store 118. In some examples, the dashboard 132 may report content loaded on the client devices 114, as well as device status, network status and other device and content metrics and data related to compliance with any appropriate requirements. The dashboard 132 may provide information in one or more areas, windows or frames. Additionally or alternatively, in some examples, the dashboard may include one or more software widgets 142 or other mini-applications in which information may be provided.

Once at least one client device 114 has downloaded an appropriate maintenance and engineering app (e.g., library app 120, maintenance app 122, parts app 124), acquired proper access per an appropriate contract, and agreed to terms of use, the dashboard 132 may be accessible to authorized devices such as one or more administrative devices 116. In some examples, the back-end platform 102—and in particular the content management server 108—may then automate subsequent client device and content management synchronization. The client devices 114 may auto-register with the back-end platform to thereby register the respective library apps with the content management platform provided by the system 100. As the client devices 114 download or delete aircraft technical content, the client devices may send device manifests (or manifest reports 134) to the back-end platform 102. In other examples, the client devices 114 may download, delete, or otherwise modify technical content that is associated with a different product. This process enables the back-end platform 102 to remain synchronized, and may allow the back-end platform 102 to track when a client device has been in "offline-mode" or otherwise offline for a certain time such that the client device has not reported to the dashboard for a period of time. The back-end platform 102 may employ a messaging service to handle many volumes of ingress of device manifests because of a software process, design and algorithm that is configured to handle incoming traffic asynchronously then properly store the device manifests in the data storage.

In some examples, the content management platform includes a data expiration timer feature that is customizable for the customer so the customer can monitor in the dashboard 132 when the data on their client devices 114 will expire or otherwise will no longer be allowable for use to perform proper maintenance. In some examples, the dashboard 132 includes a number of administrative capabilities such as sending push notifications like notifications related to data expiration. The dashboard 132 may enable notifications 144 any of a number of client devices via the back-end platform 102 and in particular the content management server 108, which may interface with known push notification services such as Apple Push Notification Service (APNS), Windows Notification Service (WNS) and the like. These are known to provide secure notifications so messages are properly broadcast. In some examples, notifications may be turned off per administrator control in the dashboard administrative settings. This may be via a cloud notification hub technology. Additionally or alternatively, in some examples, the dashboard 132 may enable an administrator to send email messages from an administrative console in the dashboard 132 for one or more up to all users of client devices that have registered with the back-end platform 102.

In some examples, the content management platform may be loosely coupled yet properly integrated with the maintenance and engineering apps (e.g., library app 120, maintenance app 122, parts app 124) and technical content authoring systems such that the back-end platform 102—and in particular the content management server 108—may automatically send notifications 144 if the administrator chooses to show when there is a new update available for technical content available for download. The back-end platform 102 may make web based calls via web services so that the interfaces are easy to maintain and highly secure for the technical content authoring systems and cloud-based systems including the back-end system 102. This may also allow the content management platform to scale and be highly secure as proven by many reviews and approvals from multiple layers of information security and as it adheres to appropriate standards for security.

The back-end platform 102—and in particular the key vault 110—may provide secure key management using a cloud key vault design. The key vault 110 may only maintain a key vault access property in one or more of the maintenance and engineering apps, such as the library app 120, which can only be utilized once the user is properly authenticated with multi-factor authentication. The content management platform may therefore allow for commercial sale and download to millions of customers who can inspect the app and utilize it as needed across their networks. The device manifest reports 130 sent securely from the client device 114 to the back-end platform 102 may be encrypted and sent with metadata to the back-end platform 102 into an asynchronous service bus to be ingested. In some examples, the device manifest reports 130 are received from the client devices securely using encryption keys 146 stored in the key vault and not originating on the client devices, the administrative device 116 or in the respective library apps. Similarly, in some examples, the dashboard 132 is sent to the administrative device 116, securely using encryption keys stored in the key vault and not originating on the client devices, the administrative device or in the respective library apps.

The dashboard 132 of example implementations may have any of a number of different data subjects useful to a provider of the content management platform and/or customers. In the context of aircraft maintenance, this may include the aircraft manufacturer and its customers (e.g., airlines). At times, a customer may be described as a company, although example implementations may be equally applicable to different groups or organizations of client devices 114—or without any specific group or organization of client devices.

Device manifest data may refer to a manifest (or manifest report 134) that data on a client device 114 related to a maintenance and engineering app—and in particular the library app 120—has changed (e.g., updated, added, deleted), and the change may be reflected in the first information 136, the second information 138, software version 140, or some combination thereof. The client device 114 may automatically send a manifest report to the back-end platform 102 when the data has changed.

Device user input data may include user input at a client device 114, or interaction with the library app 120 at the client device 114.

Compliance report data may be provided in the dashboard 132 and support functions including allowing an administrator to see a list of company client devices 114 that are being tracked for compliance by browsing, searching, and sorting. For client devices 114 that have submitted a manifest report 134 at least once, this view may also provide a link that is used to access a "Device Details" view in the dashboard 132.

Device management allows an administrator to see a list of information for company client devices 114, provides access to individual client device details, remove a client device, edit a client device or add a new client device.

Notification data allows an administrator to see the name of a person or group that receives client device emails when client devices 114 are not in compliance. An administrator can add new people or groups to this notification list and print out the list.

Data loaded on a client device 114 for use by the library app 120 and the latest version of the library app may be reported to the dashboard 132. This data may include a compliance threshold (also referred to as a data expiration timer), which may by default be set to match a company setting. This data may help users of the dashboard know the status of the data on the client devices, the metadata about the updates (e.g., the library app version number), as well as whether the client devices are "compliant" or "approved for use." Additional data in the dashboard may be based on any data management requirements for the library app 120.

Examples of suitable data management requirements for the library app 120 may include configurable expiration timers, as well as managing expiration timers separately for each data package source and for each end user (company/customer) code, such as for an airline. The data management requirements may include if an airline code's data has not been updated before the expiration timer has been reached on a device, only lock down that airline code's data. In some examples, an end user may set separate expiration timers for each package source to which the end user is subscribed. Otherwise it may revert back to a default data value. The dashboard 132 may also enable an administrator to turn off an expiration timer to disable it.

Data management requirements for the library app 120 may include that the client device 114 reports the following to the dashboard 132 (e.g., in a manifest report 134): airline code, data package source, data package identifier and/or data timer (what the expiration timer is currently set to). When a data package 128 is removed, an entry for that data package may be removed from the dashboard 132.

In some examples, data compliant symbols and compliance status may be reported in the dashboard 132 to display various statuses of a client device 114. This may include location-not-checked status when a given client device checks for updates but is unable to reach all locations (source system and operators). A location-not-updated status may indicate when a given client device checks for updates, sees updates are available in one or more locations but did not download them. A timer-expired status may indicate that an expiration timer has expired. An update-not-installed status may indicate that a given client device downloaded updates from one or more locations but did not install them. An up-to-date status may indicate that all updates have been downloaded and installed for every source system and every operator to a given client device. This status may also indicate that a client device removed an out of compliant source system or operator and all other source systems and operators expiration timers have not expired.

Additionally or alternatively, the data management requirements for the library app 120 may include a notification service that separately checks each source and each operator's data package 128 for updates on a periodic (e.g., hourly) basis. This may be customer configurable, and may be turned off.

In some examples, the dashboard 132 includes the capability to search the data within the dashboard 132, including in some cases a contextual search in certain places on the dashboard 132. A search drop-down menu selection may limit a search to a single column of information, or the dashboard 132 may look for a typed combination of characters anywhere in all fields if "All" is selected. A search field may filter based on what is entered in the field. The Search field may permit text searches of metadata about a given list of documents, and may in come examples provide full text search of information on client devices 114.

The dashboard 132 may capture metadata for content loaded on client devices 114 and hosted by the library app 120. This metadata may include, for example, one or more of the following for a document or manual:

Manual—acronym for the manual
Document Number—number of the document or manual
Title—title of the document
Model—major/minor model of the airplane to which the document applies
Last Modified Date—date that the document was last modified in the library app
Revision Date—date the document owner revised the document
Revision Number—revision number of the document The dashboard 132 may provide statistical and analytical information to customers that shows maintenance and engineering app usage and the content that users have accessed by client device 114 and over a period of time, which may assist with early detection of potential systemic issues on aircraft systems or structures. In some examples, the dashboard 132 may provide statistical and analytical information on library app usage. This may include total activities (e.g., charts, series of charts), overall app usage by client device and time, print chart, download an image in a selected format, and/or the number of times unique users have used the maintenance and engineering apps each month.

The dashboard 132 may provide the time of day the library app 120 was used. This may be provided by the hour of the day over a default or customer timer period. Similarly, the dashboard 132 may provide number of times each document or manual was viewed using the library app 120. This may be provided in charts or other visual manners over a default or custom time period.

The dashboard 132 may provide a top number of procedures most frequently visited, how many times they were viewed and the name of the task procedure. In some examples, this may be provided by fleet/model, manual type, Air Transport Association (ATA) Chapter, date range or the like.

Figure 2:
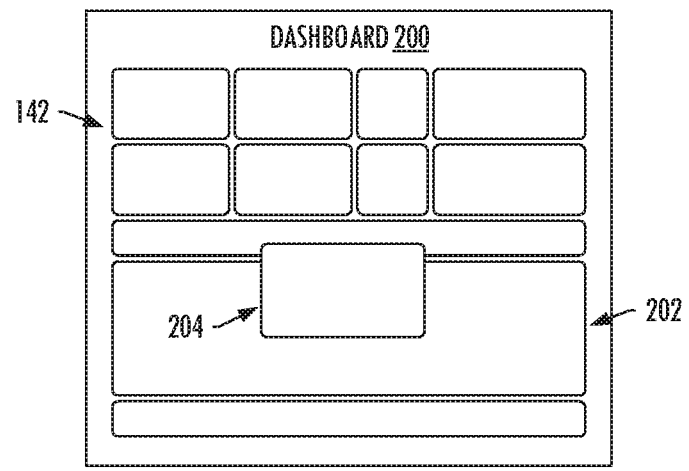
FIG. 2 illustrates a dashboard including a layout of software widgets, according to some example implementations.

Consistent with the above description, FIG. 2 illustrates a dashboard 200 that in some examples may correspond to the dashboard 132 in FIG. 1A. As shown in FIG. 2, the dashboard 132 includes a layout of software widgets 142. The dashboard 132 may also include a quick view 202 and/or a package details view 204 to provide further metrics and reporting. More particular examples of a layout of software widgets, quick view and package details view are shown in respectively FIGS. 3, 4 and 5. It is noted that in other implementations, other arrangements are contemplated.

Figure 3:
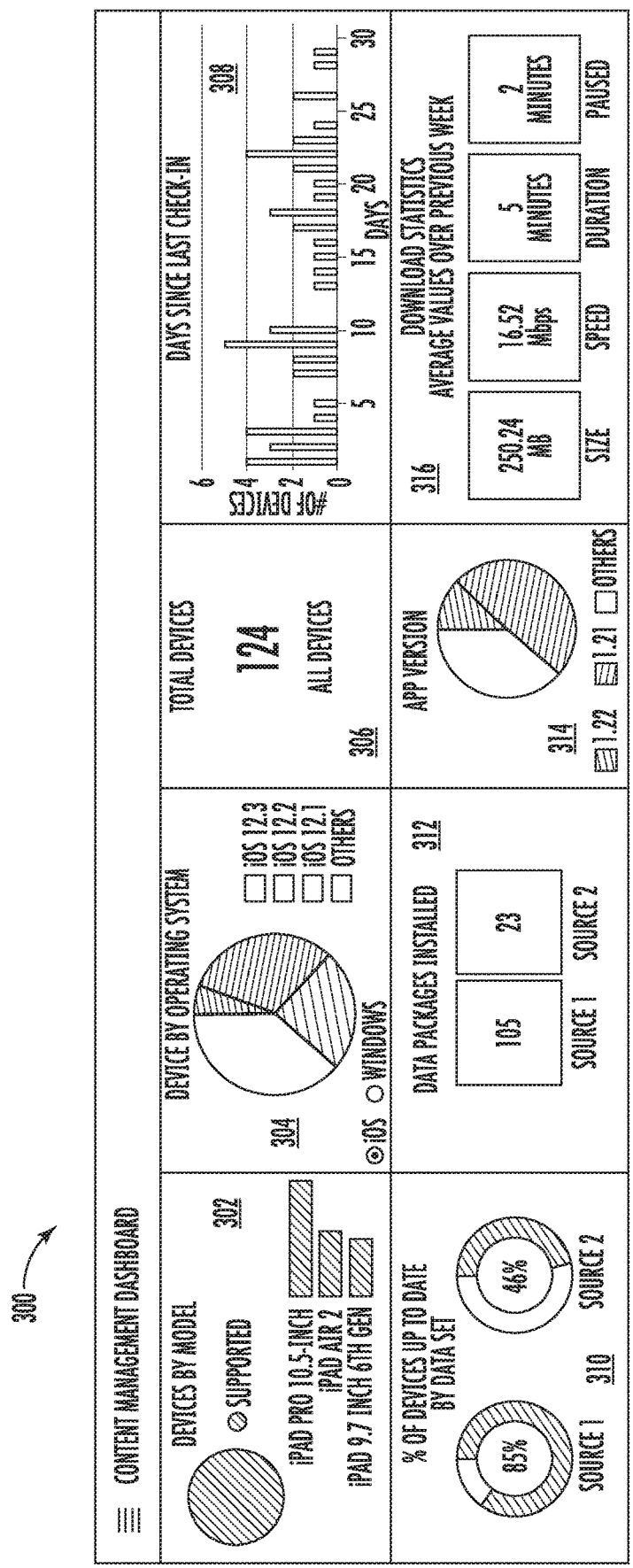

FIG. 3 is a layout of software widgets 300 that may correspond to the layout of software widgets 142 in FIGS. 1 and 2, according to some example implementations. As shown, the software widgets include one or more widgets that produces infographics visually summarizing the client devices 114 by one or more device characteristics that are distinguishing traits, qualities, or properties of the client devices, such as make, model (widget 302), operating system (widget 304) and the like. The software widgets include a widget 306 that produces an infographic visually summarizing the client devices by number of client devices, and/or a widget 308 that produces an infographic visually summarizing the client devices by time since last receipt of a device manifest report 130 from respective ones of the client devices.

In some examples in which the digital content includes items 126 of digital content that are made available to the client devices 114 in data packages 128 from respective sources 130, the layout of widgets 300 includes widgets that produce infographics visually summarizing the client devices by those up-to-date by source of the respective sources (widget 310), and number of the data packages installed by source of the respective sources (widget 312).

As indicated above, in some examples, the information included with the device manifest reports 134 further includes software version 140 of the respective library apps 120. In some of these examples, the layout of widgets 300 includes a widget 314 that produces an infographic visually summarizing the client devices 114 by software version of the respective library apps. And in some examples, the layout of widgets includes a widget 316 that produces an infographic visually summarizing the client devices by download statistics (e.g., average, median, sum, and the like) per client device over a previous duration of time.

Figure 4:
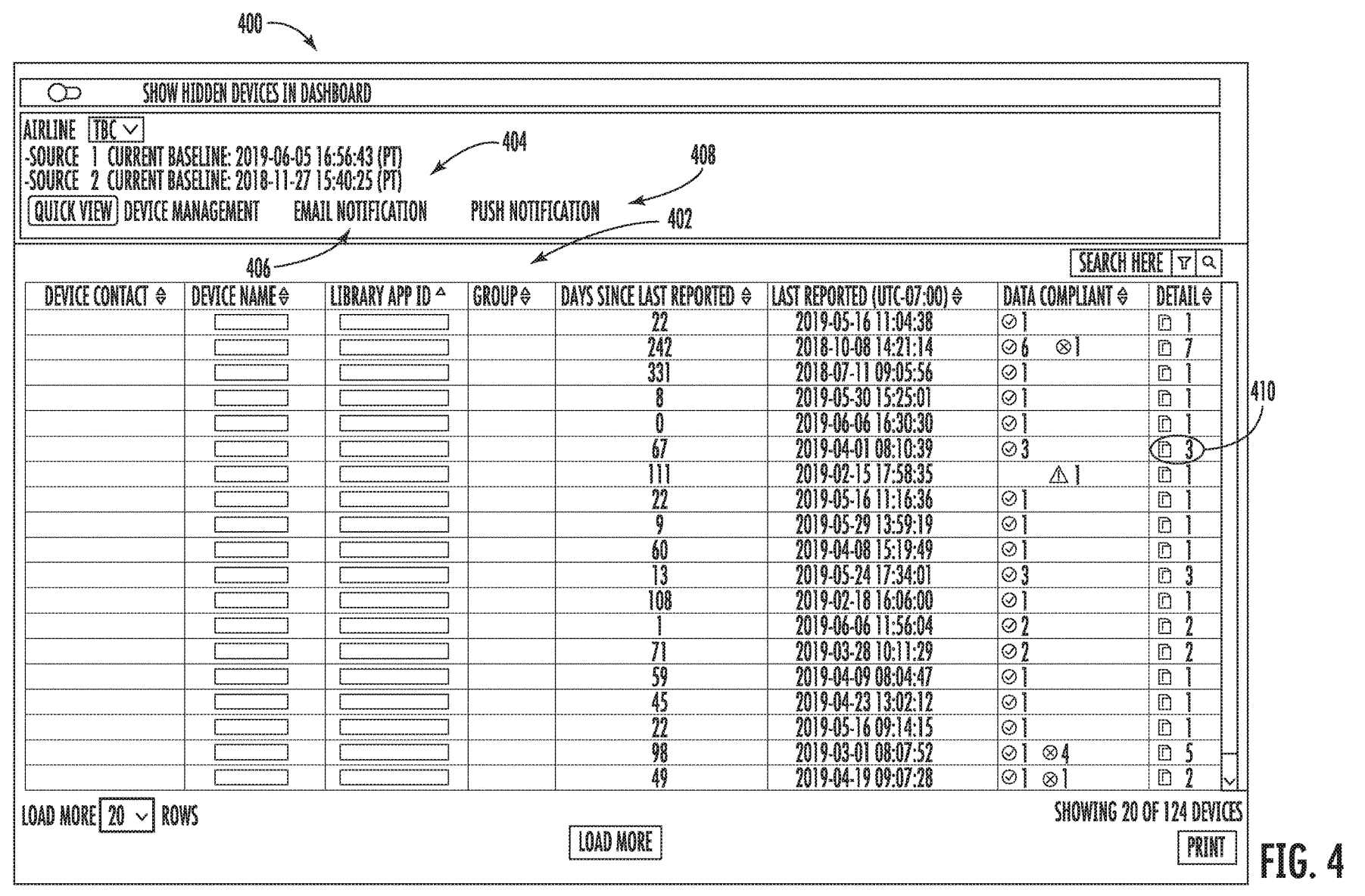

FIG. 4 is a quick view 400 that may correspond to the quick view 202 in FIG. 2, according to some example implementations. As shown, the quick view includes a table 402 of the client devices 114 with various information about the client devices, including device contact, device name, library app identifier, group, time since last receipt of a device manifest report 130, and data compliant symbols and compliance status. The quick view also includes a control 404 to enable an administrator to request for a notification 144 to the client devices. As shown, the quick view includes an "email notification" control 406 and a "push notification" control 408. The back-end platform 102 and in particular the content management server 108, then, may receive a request for the notification to selected ones 148 of the client devices, from the administrator via the dashboard displayed on the administrative device 116, and send the notification to the selected ones of the client devices in response to the request.

Figure 5:
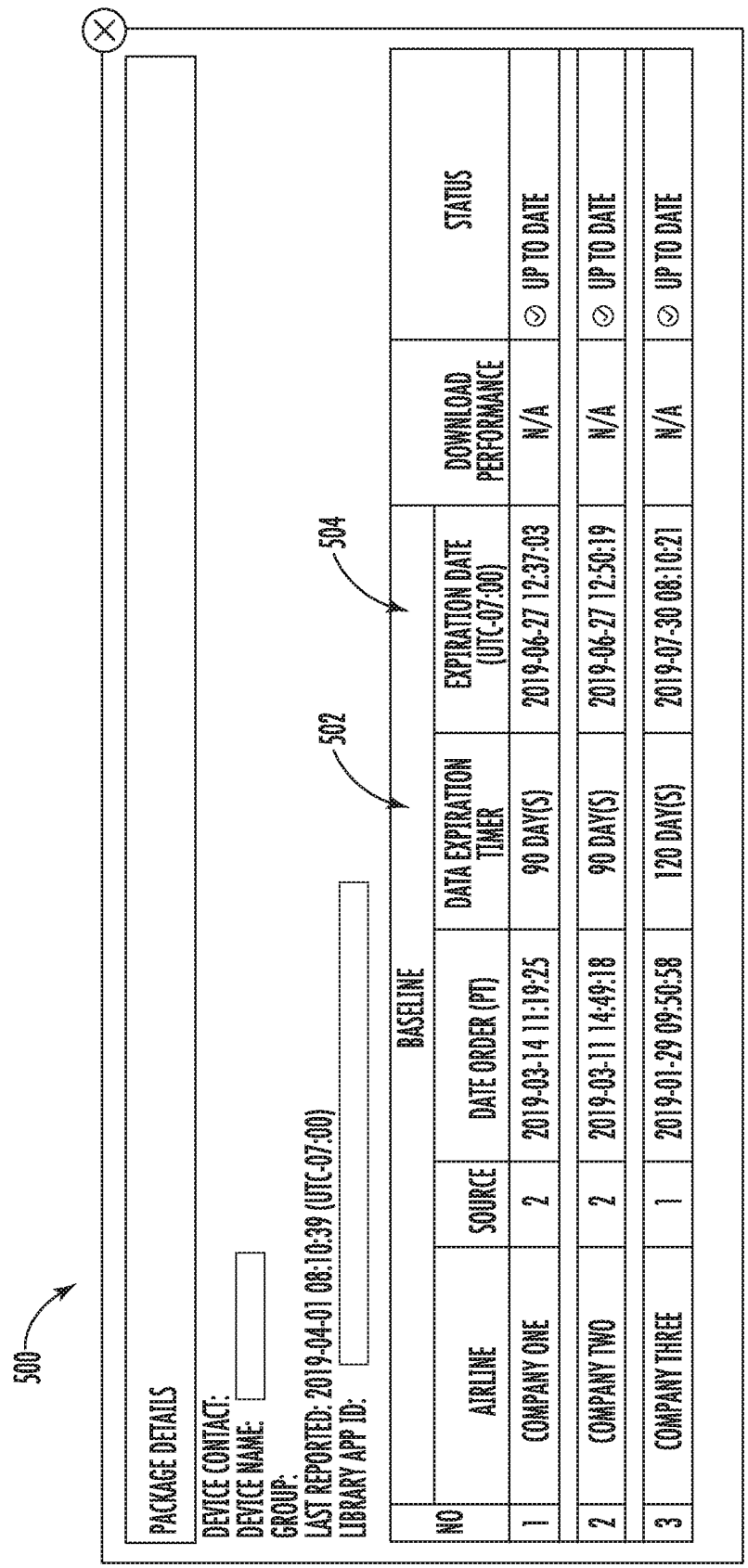

As also shown in FIG. 4, the quick view 400 includes a link or control 410 to launch a package details view for a client device 114 (the quick view including a link or control for each of the client devices shown). FIG. 5 is a package details view 500 that may correspond to the package details view 204 in FIG. 2, according to some example implementations. The package details view includes at least some of the information shown in the quick view 400 (e.g., device contact, device name, library app identifier, group, time since last receipt of a device manifest report 134, data compliant symbols and compliance status).

The package details view 500 further includes data expiration timer information. In particular, in some examples in which the digital content includes items 126 of digital content that are made available to the client devices 114 in data packages 128 from respective sources 130, the data packages from the respective sources have respective data expiration timers that indicate durations of time after which the data packages are unusable to support maintenance of the structural product. In some of these examples, the package details view indicates the data expiration timers 502 per source of the respective sources for those of the data packages on the client device. As shown, the package details view may indicate the data expiration timers, as well as expiration dates 504 per source for those of the data packages on the client device.

Figure 6:
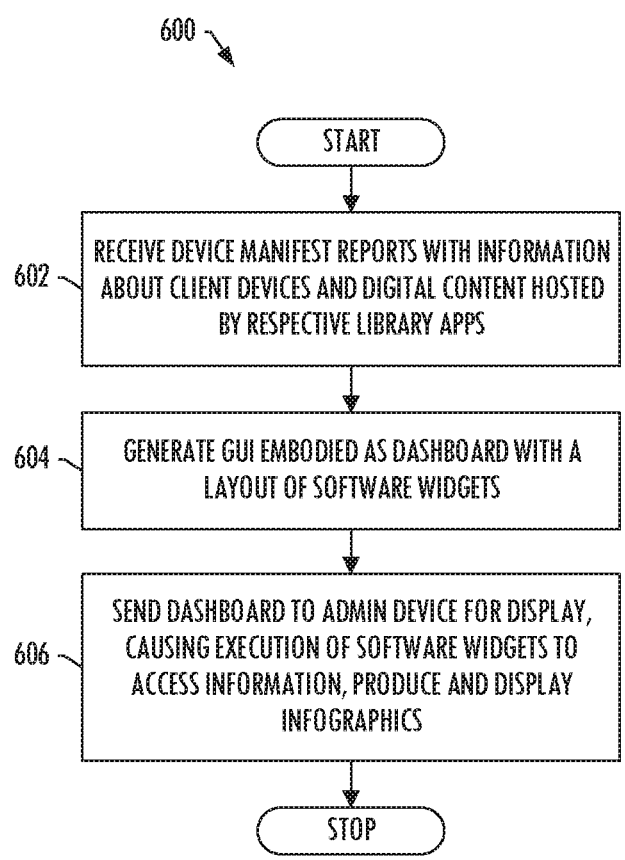
FIG. 6 is a flowchart illustrating various steps in a method of management of client devices for maintenance of a structural product, according to various example implementations.

FIG. 6 is a flowchart illustrating various steps in a method 600 of management of client devices 114 for maintenance of a structural product, according to various example implementations. As described above, the client devices include respective library apps 120 to download and host digital content related to the structural product on the client devices, with the digital content supporting maintenance of the structural product. A system 100 configured to provide a content management platform, and the method includes the content management platform receiving device manifest reports 134 that include first information 136 about the client devices and second information 138 about the digital content hosted by the respective library apps on the client devices, as shown at block 602. These device manifest reports 134 are received from the client devices 114, automatically and contemporaneous with changes in the digital content hosted by the respective library apps 120.

The method 600 includes the content management platform generating a graphical user interface (GUI) to visually summarize the information for an administrative device 116, as shown at block 604. In this regard, the GUI is embodied as a dashboard 132 with a layout of software widgets 142. And the method includes sending the dashboard 132 to the administrative device for display by the administrative device, as shown at block 606. Display of the dashboard 132 causes execution of the layout of software widgets on the dashboard 132 at the administrative device to access the information from the content management platform, produce respective infographics to visually summarize the client devices and the digital content hosted by the respective library apps 120, based on the information, and display the respective infographics in the dashboard 132 at the administrative device.

FIGS. 7, 8, 9, 10 and 11 are flowcharts of processes 700, 800, 900, 1000 and 1100 according to some example implementations of the present disclosure. These and similar processes may be setup between a provider of the content management platform (e.g., aircraft manufacturer) and a customer/company (e.g., airline). This may include the company agreeing to contract with the provider via an appropriate process during which the company obtains a unique code. The company may sign an e-enabled contract with the provider, as well as any contracts required by the provider to allow access to the maintenance and engineering apps (e.g., library app 120, maintenance app 122, parts app 124). The setup may also include setup of a company electronic access focal (EAF) to enable the EAF to manage users of client devices 114 at their company. The EAF may be given access to the dashboard 132 as an administrator, and may grant access to others at their company to access the dashboard. The EAF may also grant access to a user or list of users at the company to access one or more of the maintenance and engineering apps—and in particular the library app 120. In some examples, then, the processes shown in FIGS. 7-11 may then proceed as described above and further below.

Figure 7:
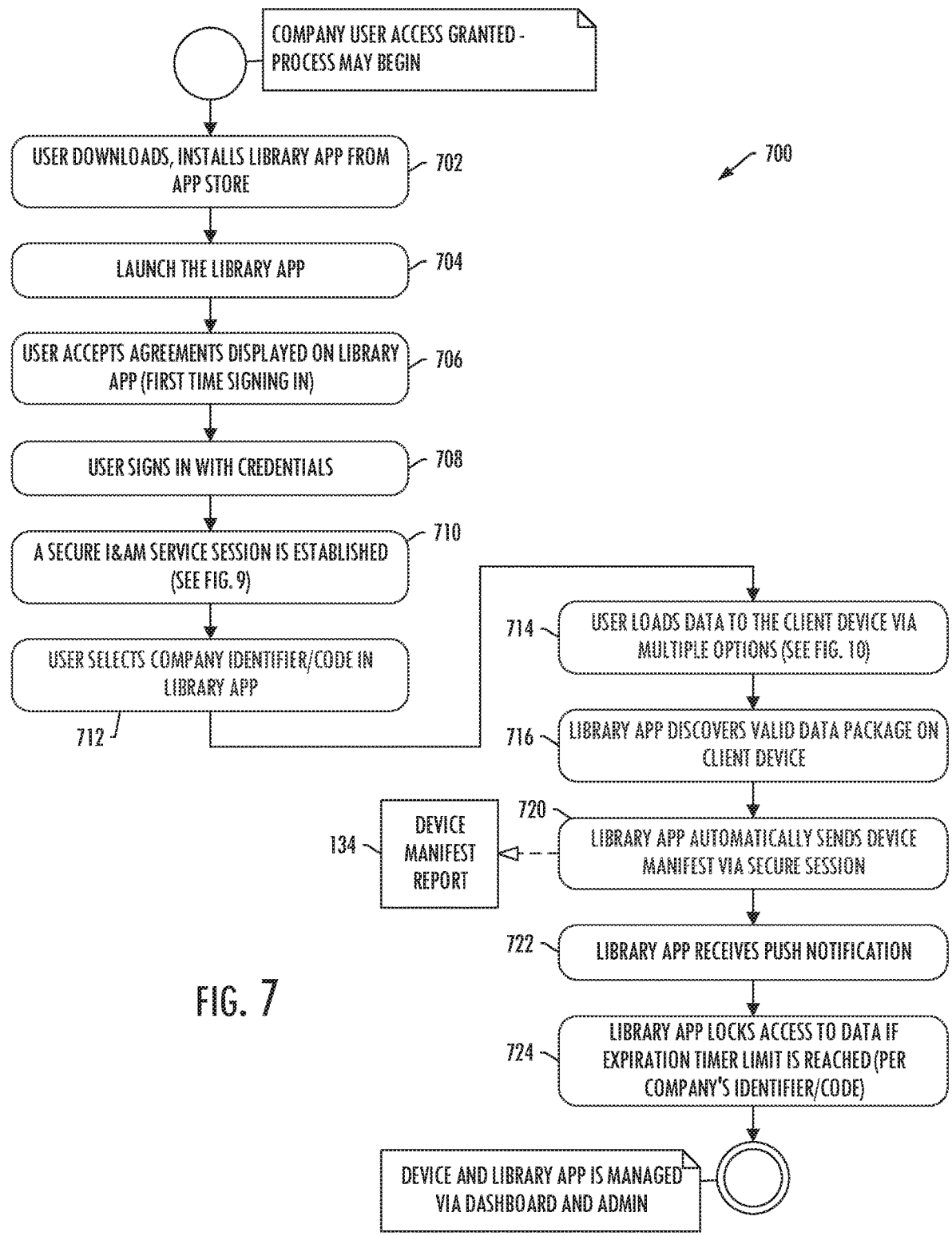
FIGS. 7, 8, 9, 10 and 11 are flowcharts of processes according to some example implementations.

FIG. 7 illustrates a process 700 at the client device 114, which in some examples begins when a user of the client device has been granted access to one or more of the maintenance and engineering apps—and in particular the library app 120. As shown at blocks 702, 704, 706 and 708, the user downloads and installs the library app from an app store 118, launches the library app, and accepts any agreements displayed in the library app (e.g., first-time signing in), and signs in with appropriate credentials. As shown at block 710 and further described in the process 900 of FIG. 9, a secure identity and access management (I&AM) session is established.

The user selects the appropriate company identifier/code in the library app 120, as shown at block 712. The user loads digital content to the client device 114, and the library app discovers a valid data package 128 on the client device, as shown at blocks 714 (and FIG. 10) and 716. The library app automatically sends a device manifest report 130 via the secure session, as shown at block 720. At times, the library app may receive a notification, and the library app may lock access to digital content if expiration timer limit is reached (per the company's identifier/code), as shown at blocks 722 and 724. The client device 114 and library app may be managed by via the administrative device 116 and dashboard 132. The client device 114 and library app 120 is managed via dashboard 132 and admin.

Figure 8:
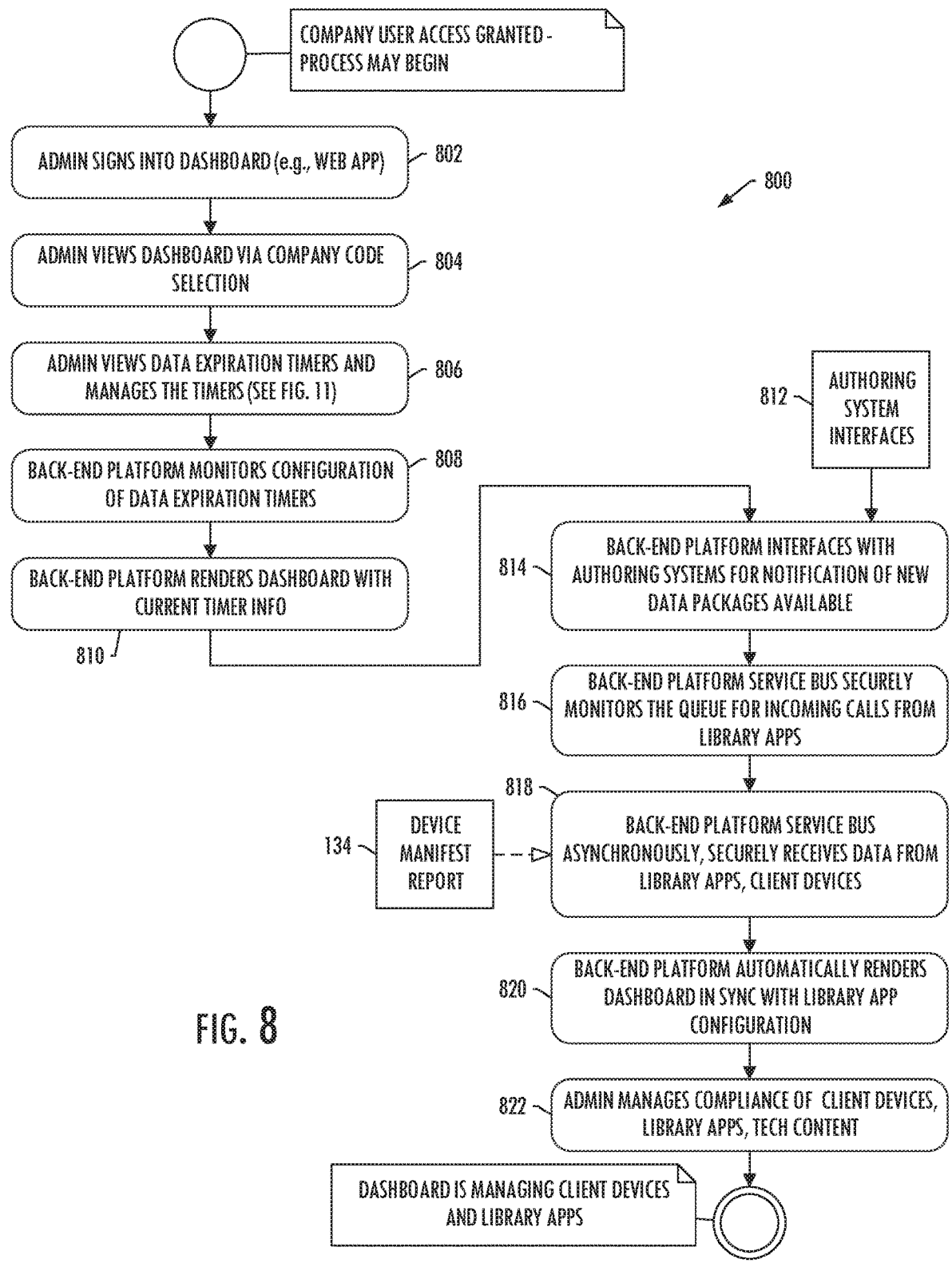

FIG. 8 illustrates a process 800 at the administrative device 116 and back-end platform 102, which in some examples begins when a company EAF has been given or otherwise granted access to the dashboard 132 as an administrator. As shown at blocks 802, 804 and 806 (and FIG. 11), the administrator signs into the dashboard 132 such as via a web app, views the dashboard 132 via company code selection, and views and manages data expiration timers. The back-end platform 102 monitors configuration of data expiration timers, and renders the dashboard with current expiration timer information, as shown at blocks 808 and 810.

The back-end platform 102 interfaces with authoring systems 812 or other content source(s) 130 for notification of the availability of new data packages 128, and the back-end platform 102 of a service bus of the back-end platform 102 securely monitors a queue for incoming calls from library apps 120, as shown in blocks 814 and 816. The back-end platform 102 or its service bus asynchronously, securely receives digital content from library apps or client devices 114, such as via device manifest reports 130, as shown at block 818. The back-end platform 102 automatically renders the dashboard 132 in sync with library app configuration, and the administrator manages compliance of client devices, library apps 120, digital content and the like, as shown in blocks 820 and 822. The dashboard 132 is managing client devices and library apps 120.

Figure 9:
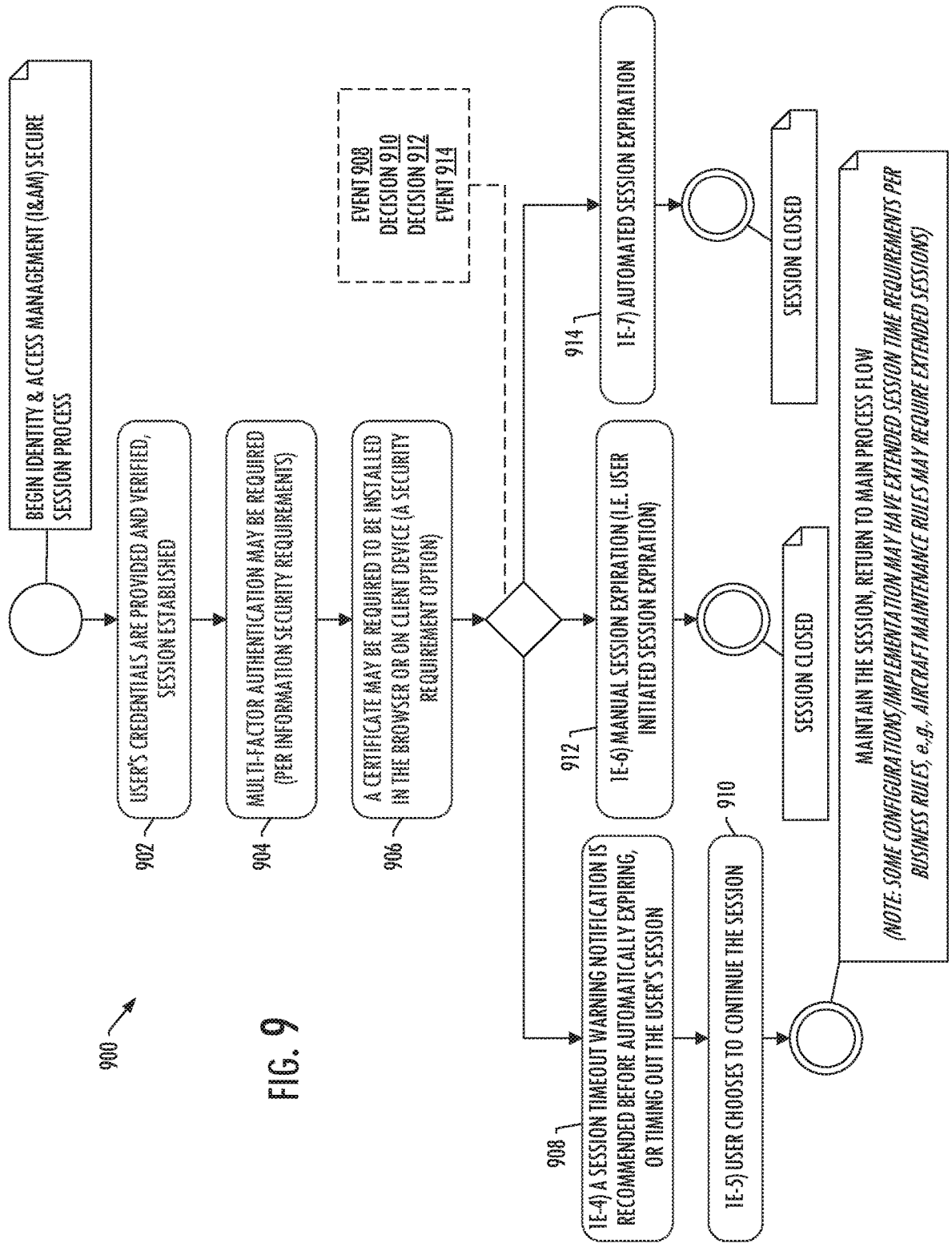

FIG. 9 illustrates a process 900 for establishing an I&AM secure session according to some examples. As shown at block 902, the user's credentials are provided and verified, session established. In some examples, multi-factor authentication may be required (per information security requirements), as shown at block 904. Additionally or alternatively, a certificate may be required to be installed in the browser or on client device 114 (a security requirement option), as shown at block 906. During the I&AM secure session, a session timeout warning notification is recommended before automatically expiring, or timing out the user's session, and the user may choose to continue the session, as shown at blocks 908 and 910. In this case, the session may be maintained and returned to its main process flow, such as that represented by process 700, process 800, or both processes 700 and 800. In some configurations or implementation, there may be extended session time requirements per business rules, e.g., aircraft maintenance rules may require extended sessions. The user may manually expire the session, or the session may automatically expire, as shown at blocks 912 and 914.

Figure 10:
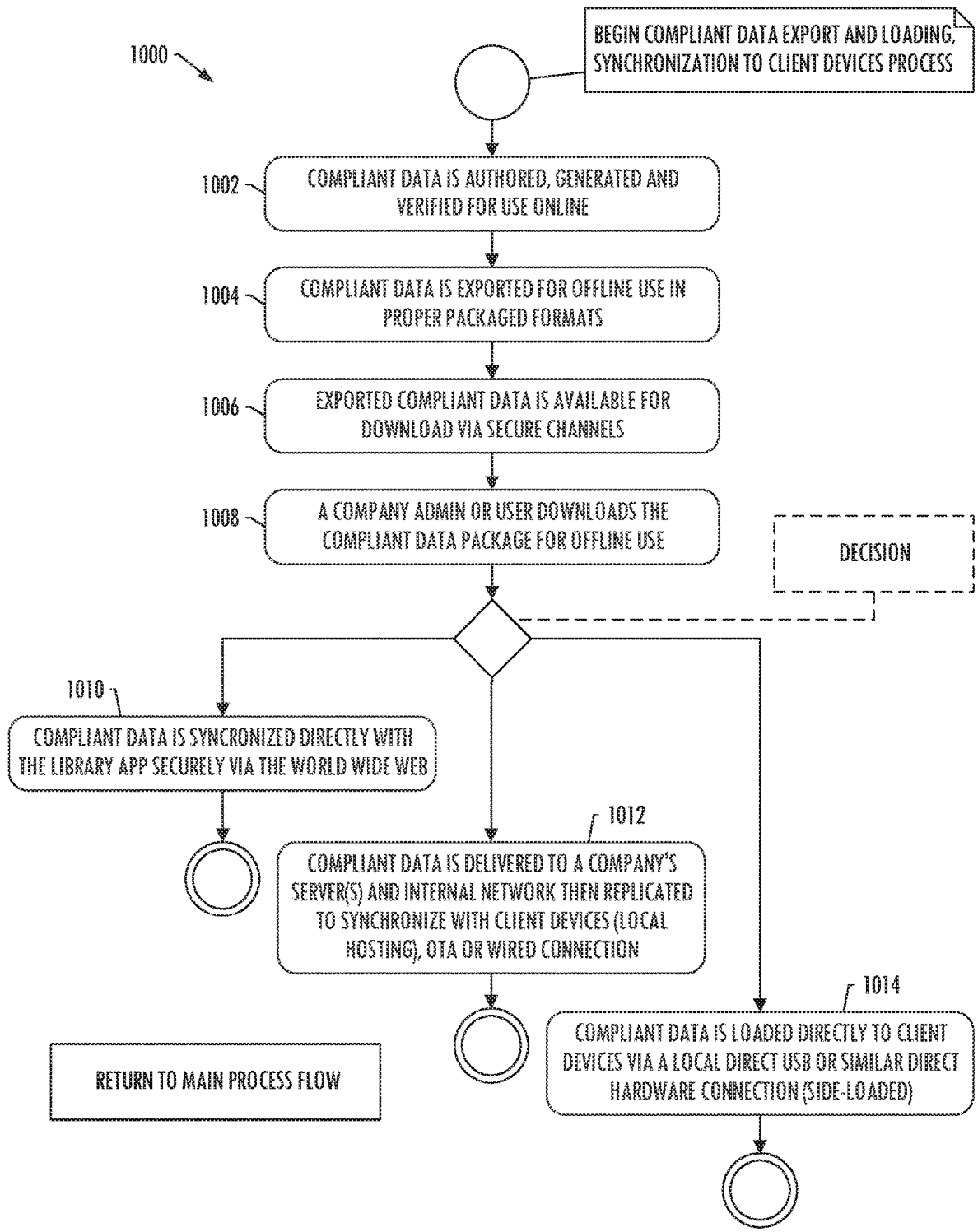

FIG. 10 illustrates a process 1000 for compliant digital content export and loading, and synchronization to client devices 114, according to some examples. As shown at block 1002, compliant digital content is authored, generated and verified for use online. The compliant digital content is exported for offline use in proper packaged formats, and the thereby exported, compliant digital content is available for download via secure channels, as shown at blocks 1004 and 1006.

An administrator or user downloads the compliant data package 128 for offline use, as shown at blocks 1008. The compliant digital content is securely synchronized directly with the user's library app 120, such as via the world wide web, as shown at block 1010. The compliant digital content is delivered to a company's server(s) and internal network, and then replicated to synchronize with client devices (local hosting), such as over-the-air (OTA) or wired connection, as shown at block 1012. Or as shown at block 1014, the compliant digital content is loaded directly to client devices via a local direct USB or similar direct hardware connection (side-loaded), as shown at block 1016.

Figure 11:
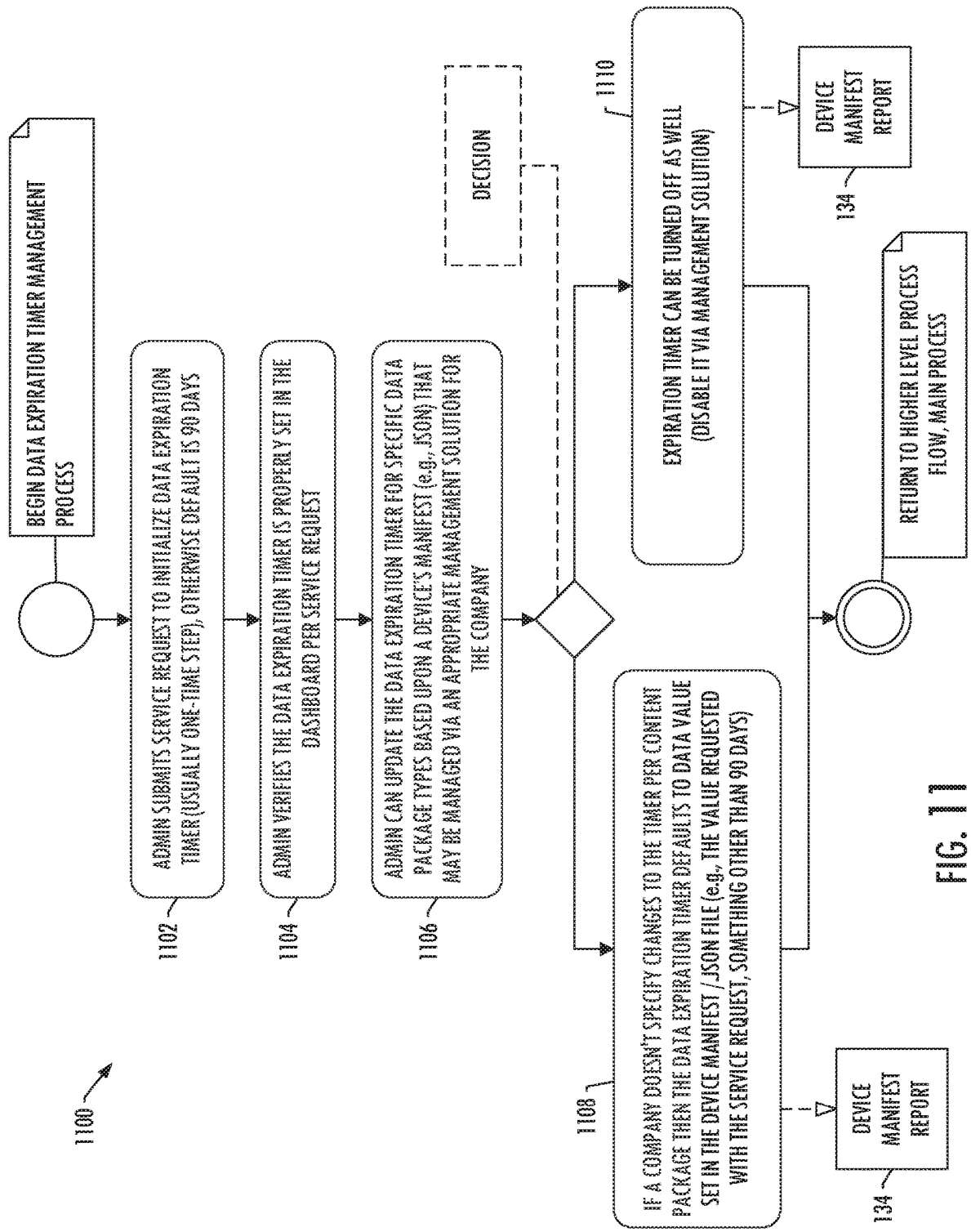

FIG. 11 illustrates a process 1100 for data expiration timer management, according to some examples. As shown at blocks 1102 and 1104, an administrator submits a service request to initialize data expiration timer (usually one-time step)—or the system may default to 90 days or some other timeframe, and the administrator verifies the data expiration timer is properly set in the dashboard 132 per service request. The administrator may update the data expiration timer for specific data package types based upon a device's manifest (e.g., JSON—JavaScript Object Notation) that may be managed via an appropriate management solution for the company, as shown at block 1106.

If a company doesn't specify changes to the data expiration timer per data package 128, the data expiration timer may default to a data value set in the device manifest report (e.g., JSON file), as shown at block 1108. In this regard, the value may be requested with the service request, something other than 90 days). Similarly, the data expiration timer may be turned off or otherwise disabled, such as via a management solution, as shown at block 1110.

According to example implementations of the present disclosure, the system 100 and its subsystems including the back-end platform 102, front-end platform 106, content management server 108, key vault 110, analytics server 112, client devices 114, administrative devices 116, and/or app store 118 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network 104 or the like.

Figure 12:
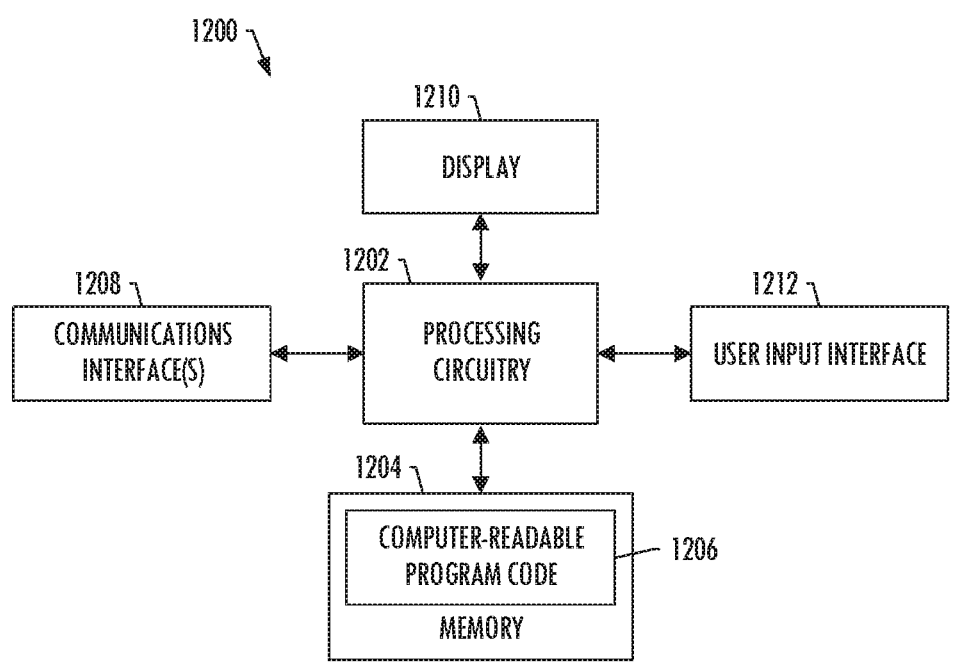
FIG. 12 illustrates an apparatus according to some example implementations.

FIG. 12 illustrates an apparatus 1200 according to some example implementations of the present disclosure. Generally, an apparatus of exemplary implementations of the present disclosure may comprise, include or be embodied in one or more fixed or portable electronic devices. Examples of suitable electronic devices include a server computer, workstation computer, desktop computer, portable computer, mobile phone, wearable computer or the like. The apparatus may include one or more of each of a number of components such as, for example, processing circuitry 1202 (e.g., processor unit) connected to a memory 1204 (e.g., storage device).

The processing circuitry 1202 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1204 (of the same or another apparatus).

The processing circuitry 1202 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1204 is generally any piece of computer hardware that is capable of storing information such as, for example, data, computer programs (e.g., computer-readable program code 1206) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1204, the processing circuitry 1202 may also be connected to one or more interfaces for displaying, transmitting and/or receiving information. The interfaces may include a communications interface 1208 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1210 and/or one or more user input interfaces 1212 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1200 may include a processing circuitry 1202 and a computer-readable storage medium or memory 1204 coupled to the processing circuitry, where the processing circuitry is configured to execute computer-readable program code 1206 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for management of client devices for maintenance of a structural product, the client devices including respective library apps to download and host digital content related to the structural product on the client devices, the digital content supporting maintenance of the structural product, the apparatus comprising:
    a memory configured to store computer-readable program code; and
    processing circuitry configured to access the memory, and execute the computer-readable program code to cause the apparatus to at least:
        receive device manifest reports that include first information about the client devices and second information about the digital content hosted by the respective library apps on the client devices, the device manifest reports received from the client devices, automatically and contemporaneous with changes in the digital content hosted by the respective library apps, wherein the manifest reports include compliance statuses of the digital content hosted by the respective library apps on the client devices;
        generate a graphical user interface (GUI) to visually summarize the information for an administrative device, the GUI embodied as a dashboard with a layout of software widgets;
        send the dashboard to the administrative device for display by the administrative device, display of the dashboard causing execution of the layout of software widgets on the dashboard at the administrative device to access the information from a content management platform, produce respective infographics to visually summarize the client devices and the digital content hosted by the respective library apps, based on the information, and display the respective infographics in the dashboard at the administrative device, the infographics for a client device including the compliance statuses of the digital content hosted by the respective library apps on the client device; and
        in response to a compliance status of digital content hosted by a respective library app on a client device exceeding a compliance threshold, automatically sending a notification to the respective library app on the client device hosting the digital content, the notification instructing the library app to lock access to the digital content from the client device for non-compliance.

2. The apparatus of claim 1, wherein the apparatus caused to generate the GUI includes the apparatus caused to generate the GUI embodied as the dashboard with the layout of widgets including one or more widgets that produce infographics visually summarizing the client devices by one or more device characteristics, number of client devices, and time since last receipt of a device manifest report from respective ones of the client devices.

3. The apparatus of claim 1, wherein the digital content includes items of digital content that are made available to the client devices in data packages from respective sources, and
    wherein the apparatus caused to generate the GUI includes the apparatus caused to generate the GUI embodied as the dashboard with the layout of widgets including widgets that produce infographics visually summarizing the client devices by those up-to-date by source of the respective sources, and number of the data packages installed by source of the respective sources.

4. The apparatus of claim 1, wherein the information included with the device manifest reports further includes software version of the respective library apps, and
    wherein the apparatus caused to generate the GUI includes the apparatus caused to generate the GUI embodied as the dashboard with the layout of widgets including a widget that produces an infographic visually summarizing the client devices by software version of the respective library apps.

5. The apparatus of claim 1, wherein the apparatus caused to generate the GUI includes the apparatus caused to generate the GUI embodied as the dashboard with the layout of widgets including a widget that produces an infographic visually summarizing the client devices by download statistics per client device over a previous duration of time.

6. The apparatus of claim 1, wherein the dashboard further includes a control to enable an administrator to request for a notification to the client devices, and the processing circuitry is configured to execute the computer-readable program code to cause the apparatus to further at least:
    receive a request from the administrator via the dashboard displayed on the administrative device, the request for the notification to selected ones of the client devices; and
    send the notification to the selected ones of the client devices in response to the request.

7. The apparatus of claim 1, wherein the digital content includes items of digital content that are made available to the client devices in data packages from respective sources, the data packages from the respective sources having respective data expiration timers that indicate durations of time after which the data packages are unusable to support maintenance of the structural product, and
    wherein the apparatus caused to generate the GUI includes the apparatus caused to generate the GUI embodied as the dashboard further including a package detail per client device that indicates the data expiration timers per source of the respective sources for those of the data packages on the client device.

8. The apparatus of claim 1, wherein the processing circuitry is configured to execute the computer-readable program code to cause the apparatus to further interface with an app store from which the respective library apps are downloadable to the client devices.

9. The apparatus of claim 1, wherein the processing circuitry is configured to execute the computer-readable program code to cause the apparatus to further automatically register the respective library apps with the content management platform to at least send the device manifest reports to the content management platform, the respective library apps automatically registered with multi-factor authentication.

10. The apparatus of claim 1, wherein device manifest reports are received from the client devices, and the dashboard is sent to the administrative device, securely using encryption keys stored in a key vault and not originating on the client devices, the administrative device or in the respective library apps.

11. A method of management of client devices for maintenance of a structural product, the client devices including respective library apps to download and host digital content related to the structural product on the client devices, the digital content supporting maintenance of the structural product, the method comprising a content management platform:
    receiving device manifest reports that include first information about the client devices and second information about the digital content hosted by the respective library apps on the client devices, the device manifest reports received from the client devices, automatically and contemporaneous with changes in the digital content hosted by the respective library apps, wherein the manifest reports include compliance statuses of the digital content hosted by the respective library apps on the client devices;
    generating a graphical user interface (GUI) to visually summarize the information for an administrative device, the GUI embodied as a dashboard with a layout of software widgets;
    sending the dashboard to the administrative device for display by the administrative device, display of the dashboard causing execution of the layout of software widgets on the dashboard at the administrative device to access the information from the content management platform, produce respective infographics to visually summarize the client devices and the digital content hosted by the respective library apps, based on the information, and display the respective infographics in the dashboard at the administrative device, the infographics for a client device including the compliance statuses of the digital content hosted by the respective library apps on the client device; and
    in response to a compliance status of digital content hosted by a respective library app on a client device exceeding a compliance threshold, automatically sending a notification to the respective library app on the client device hosting the digital content, the notification instructing the library app to lock access to the digital content from the client device for non-compliance.

12. The method of claim 11, wherein generating the GUI includes generating the GUI embodied as the dashboard with the layout of widgets including one or more widgets that produce infographics visually summarizing the client devices by one or more device characteristics, number of client devices, and time since last receipt of a device manifest report from respective ones of the client devices.

13. The method of claim 11, wherein the digital content includes items of digital content that are made available to the client devices in data packages from respective sources, and
    wherein generating the GUI includes generating the GUI embodied as the dashboard with the layout of widgets including widgets that produce infographics visually summarizing the client devices by those up-to-date by source of the respective sources, and number of the data packages installed by source of the respective sources.

14. The method of claim 11, wherein the information included with the device manifest reports further includes software version of the respective library apps, and
    wherein generating the GUI includes generating the GUI embodied as the dashboard with the layout of widgets including a widget that produces an infographic visually summarizing the client devices by software version of the respective library apps.

15. The method of claim 11, wherein generating the GUI includes generating the GUI embodied as the dashboard with the layout of widgets including a widget that produces an infographic visually summarizing the client devices by download statistics per client device over a previous duration of time.

16. The method of claim 11, wherein the dashboard further includes a control to enable an administrator to request for a notification to the client devices, and the method further comprises the content management platform:
    receiving a request from the administrator via the dashboard displayed on the administrative device, the request for the notification to selected ones of the client devices; and
    sending the notification to the selected ones of the client devices in response to the request.

17. The method of claim 11, wherein the digital content includes items of digital content that are made available to the client devices in data packages from respective sources, the data packages from the respective sources having respective data expiration timers that indicate durations of time after which the data packages are unusable to support maintenance of the structural product, and wherein generating the GUI includes generating the GUI embodied as the dashboard further including a package detail per client device that indicates the data expiration timers per source of the respective sources for those of the data packages on the client device.

18. The method of claim 11 further comprising the content management platform interfacing with an app store from which the respective library apps are downloadable to the client devices.

19. The method of claim 11 further comprising the content management platform automatically registering the respective library apps with the content management platform to at least send the device manifest reports to the content management platform, the respective library apps automatically registered with multi-factor authentication.

20. The method of claim 11, wherein device manifest reports are received from the client devices, and the dashboard is sent to the administrative device, securely using encryption keys stored in a key vault and not originating on the client devices, the administrative device or in the respective library apps.

* * * * *